(12) United States Patent
Mizrahi (10) Patent No.: US 9,780,417 B2
(45) Date of Patent: Oct. 3, 2017

(54) SYSTEM AND METHOD FOR INCREASING OPERATIONAL TIME OF AN ELECTRONIC DEVICE

(71) Applicant: Mizco International Inc., Avenel, NJ (US)

(72) Inventor: Maurice Mizrahi, Brooklyn, NY (US)

(73) Assignee: MIZCO INTERNATIONAL INC., Avenel, NJ (US)

( * ) Notice: Subject to any disclaimer, the term of this patent is extended or adjusted under 35 U.S.C. 154(b) by 409 days.

(21) Appl. No.: 14/315,259

(22) Filed: Jun. 25, 2014

(65) Prior Publication Data

US 2015/0380709 A1    Dec. 31, 2015

(51) Int. Cl.
*H01M 2/20* (2006.01)
*H01M 10/48* (2006.01)
*H02J 7/00* (2006.01)
*H01M 2/10* (2006.01)

(52) U.S. Cl.
CPC ....... *H01M 10/488* (2013.01); *H01M 2/1066* (2013.01); *H02J 7/0045* (2013.01); *H01M 2220/30* (2013.01)

(58) Field of Classification Search
CPC ............ H01M 10/488; H01M 2/1022; H01M 2/1061; H01M 2/1066; H01M 2220/30; H02J 7/0045; H02J 7/0042
See application file for complete search history.

(56) References Cited

U.S. PATENT DOCUMENTS

| 5,669,020 A | 9/1997 | Hopmeyer |
| 7,060,921 B2 | 6/2006 | Kubo |
| D644,679 S | 9/2011 | Woodman |
| 8,013,932 B2 | 9/2011 | Chan |

(Continued)

FOREIGN PATENT DOCUMENTS

| EP | 2600325 A1 | 6/2013 |
| WO | 2009/111743 A1 | 9/2009 |

(Continued)

OTHER PUBLICATIONS

Search Report & Written Opinion for PCT/US14/44187 dated Sep. 17, 2014; 9 pages.

*Primary Examiner* — Miriam Stagg
*Assistant Examiner* — Kiran Akhtar
(74) *Attorney, Agent, or Firm* — Loza & Loza, LLP; Jeffrey T. Burgess (57) ABSTRACT

A system and method for increasing the operating time of electronic devices, such as a point of view camera, are provided. The system includes a connector block sized to be received within a battery chamber of an electronic device. A battery pack is then attached to the connector block for providing power to the electronic device. The battery pack includes an outer battery housing, one or more batteries and an inner battery housing. The outer battery housing includes a cavity adapted to receive the one or more batteries. The opening of the cavity is sized to receive the inner battery housing and retain the inner battery housing with a friction fit, thereby retaining the outer battery housing and the inner battery housing together. When the battery pack is attached to a front housing portion of an electronic device housing, power is provided to the electronic device via the connector block.

13 Claims, 11 Drawing Sheets

(56) References Cited

U.S. PATENT DOCUMENTS

| | | |
|---|---|---|
| 8,014,656 B2 | 9/2011 | Woodman |
| D646,313 S | 10/2011 | Woodman |
| D647,554 S | 10/2011 | Yim |
| D657,808 S | 4/2012 | Woodman |
| D657,811 S | 4/2012 | Woodman |
| 8,199,251 B2 | 6/2012 | Woodman |
| 8,325,270 B2 | 12/2012 | Woodman |
| D674,428 S | 1/2013 | Woodman |
| D674,429 S | 1/2013 | Woodman |
| 8,544,643 B2 | 10/2013 | Yim |
| 8,638,392 B2 | 1/2014 | Woodman |
| D699,947 S | 2/2014 | To et al. |
| 2006/0008262 A1 | 1/2006 | Watanabe et al. |
| 2007/0071423 A1 | 3/2007 | Fantone et al. |
| 2010/0060747 A1* | 3/2010 | Woodman ............. G03B 17/02 348/222.1 |
| 2011/0187324 A1* | 8/2011 | Tan ...................... H02J 7/0045 320/111 |
| 2013/0315577 A1 | 11/2013 | Clark et al. |

FOREIGN PATENT DOCUMENTS

| | | | |
|---|---|---|---|
| WO | 2012/178205 A2 | 12/2012 | |
| WO | WO2012/178205 | * 12/2012 | ............. H01M 2/04 |

\* cited by examiner

FIGURE 16

SYSTEM AND METHOD FOR INCREASING OPERATIONAL TIME OF AN ELECTRONIC DEVICE

FIELD

The present disclosure relates generally to increasing the operational time of electronic devices, such as point of view (POV) cameras, using battery packs.

BACKGROUND

Advances in recording technology and a growing interest in video and audio capture for a variety of applications have created a growing market for point of view (POV) cameras. POV cameras are widely used to provide hands free video and/or still image recording that approximately match the perspective of the user when engaged in an activity. The cameras are typically lightweight, rugged, and mountable in unusual places such as outside planes, cars, or boats; or wearable by users such as on headgear, helmets, clothing items or equipment.

As with other portable consumer electronic devices, POV cameras use rechargeable batteries located within the camera as their power source. However, all batteries have one major drawback; they only last for a limited time. Since POV cameras are typically used when the user is engaged in an activity and cannot easily replace or recharge the batteries, increasing operational time of the POV camera is extremely important. As a result of the limited operational time, users often experience frustration when they believe they are filming that once-in-a-lifetime shot only to find out later their batteries were drained either before or during the recording of the shot.

Consequently, a system and method for increasing the operational time of an electronic device, such as a POV camera, is needed.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one aspect, a battery pack system is provided. The battery back system may comprise a connector block, sized to be received within an empty battery chamber of an electronic device, and a battery pack. The connector block may include a first plurality of connector block electrical connections and a second plurality of connector block electrical connections in electrical communication with the first plurality of connector block electrical connections for providing power to the electronic device. The battery pack may include an outer battery housing having a back side, a top side, a bottom side, a left side and a right side structured to form a cavity; one or more batteries adapted to be received within the cavity; and an inner battery housing, having a front surface, a back surface, a top edge, a bottom edge, a left edge and a right edge, for detachably coupling with the outer battery housing opposite the back side of the outer battery housing to enclose the one or more batteries within the outer battery housing.

According to one feature, the inner battery housing may include a plurality of inner battery housing electrical connections extending from the front surface to the back surface and adapted to connect to the first plurality of connector block electrical connections of the connector block.

According to another feature, the inner battery housing may further include a battery test button, in electrical communication with the one or more batteries, located on the front surface of the inner battery housing; and a plurality of battery gauge indictors, in electrical communication with the battery test button and the one or more batteries, located on the right edge or left edge of the inner battery housing and visible from an exterior of the outer battery housing. Each of the plurality of gauge indicators may be a light emitting diode.

According to yet another feature, the inner battery housing may further include a universal serial bus (USB) connector, in electrical communication with the one or more batteries and located on the inner battery housing, adapted for connecting with a power source for recharging the one or more batteries. The USB connector may be adapted to connect to and charge a mobile communication device.

According to yet another feature, the inner battery housing may further include a pair of opposing foam pads located on the front surface to maintain electrical communication between the plurality of inner battery housing electrical connections and the first plurality of connector block electrical connections.

According to yet another feature, the connector block may include a pair of opposing finger grips, the first plurality of connector block electrical connections located between each finger grip of the pair of opposing finger grips.

According to yet another feature, the outer battery housing may further comprise an outer battery housing hinge portion adapted to snap onto a first hinge portion of a front housing portion of an electronic device housing, the electronic device secured within the front housing portion. The outer battery housing may be adapted to swing towards the front housing portion of the electronic device housing when snapped onto the first hinge portion. The outer battery housing mechanically connects to the front housing portion of the electronic device housing creating a waterproof seal. The electronic device is a point of view camera.

According to another aspect, a battery pack system is provided. The battery pack system includes a connector block sized to be received within an empty battery chamber of an electronic device and a battery pack.

According to one feature, the connector block may include a first plurality of connector block electrical connections; a pair of opposing finger grips, the first plurality of connector block electrical connections located between each finger grip of the pair of opposing finger grips; and a second plurality of connector block electrical connections, in electrical communication with the first plurality of connector block electrical connections, for providing power to the electronic device.

According to another feature, the battery pack may include an outer battery housing having a back side, a top side, a bottom side, a left side and a right side structured to form a cavity; one or more batteries adapted to be received within the cavity; and an inner battery housing, having a front surface, a back surface, a top edge, a bottom edge, a left edge and a right edge, for detachably coupling with the outer battery housing opposite the back side of the outer battery housing to enclose the one or more batteries within the outer battery housing, the inner battery housing comprising a plurality of inner battery housing electrical connections extending from the front surface to the back surface and adapted to connect to the first plurality of connector block electrical connections.

According to yet another feature, the outer battery housing may further comprise an outer battery housing hinge portion adapted to snap onto a first hinge portion of a front housing portion of an electronic device housing, the electronic device secured within the front housing portion. The outer battery housing may be adapted to swing towards the front housing portion of the electronic device housing when snapped onto the first hinge portion. The outer battery housing mechanically connects to the front housing portion of the electronic device housing creating a waterproof seal. The electronic device is a point of view camera.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION

In the following detailed description, numerous specific details are set forth in order to provide a thorough understanding of the embodiments. However, it will be understood by one of ordinary skill in the art that the embodiments may be practiced without these specific details. For example, operations may be shown in block diagrams, or not be shown at all, in order not to obscure the embodiments in unnecessary detail. In other instances, well-known operations, structures and techniques may not be shown in detail in order not to obscure the embodiments.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

In the following description, certain terminology is used to describe certain features of one or more embodiments. The term "electronic device" may refer to any type of rechargeable communication device. The term "electrical connection" may refer any type of object, device or material that permits the flow of electrical current in one or more direction including, but not limited to, electrical contacts, pogo pins and wiring.

While the present disclosure is described primarily with respect to increasing the operational time of a point of view camera, the present disclosure may be applied and adapted to increasing the operational time of any stationary or mobile electronic device, including but not limited to, still cameras, video cameras, mobile phones, tablets, computers and drones.

Overview

One or more embodiments of the present disclosure are directed to a system and method for increasing the operational time of electronic devices. For example, the electronic device may be a point of view camera, including but not limited to the various models of the GoPro® camera. To increase the operational time, the battery of the electronic device may be removed and replaced with a connector block, configured to extend an electrical connection between the electrical connection(s) of the electronic device that normally contacted the battery, such that they may be in electrical contact with a battery pack.

The battery pack may include an outer battery housing, one or more batteries, and an inner battery housing. The outer battery housing may include a cavity adapted to receive the one or more batteries. The opening of the cavity may be sized to receive the inner battery housing and retain the inner battery housing with a friction fit, thereby retaining the outer battery housing and the inner battery housing together. The outer housing portion may be connected to the front housing portion containing the point of view camera forming an electronic device housing when mechanically connected. The battery pack may be connected to the front housing portion by coupling a hinge portion, located on the outer battery housing of the battery pack, onto a hinge portion of the front housing portion of the electronic device housing. When the electronic device housing is mechanically connected together, the connector block may be electronically connected to the one or more batteries providing power to the electrical device.

Typical Point of View Camera Located in a Protective Housing

Figure 1:
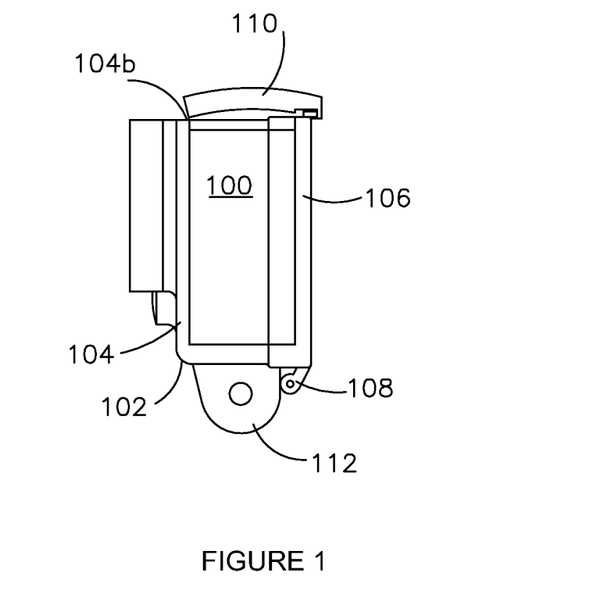
FIG. 1 illustrates a side plan view of a typical camera housing with a point of view camera located inside the housing.
Figure 2:
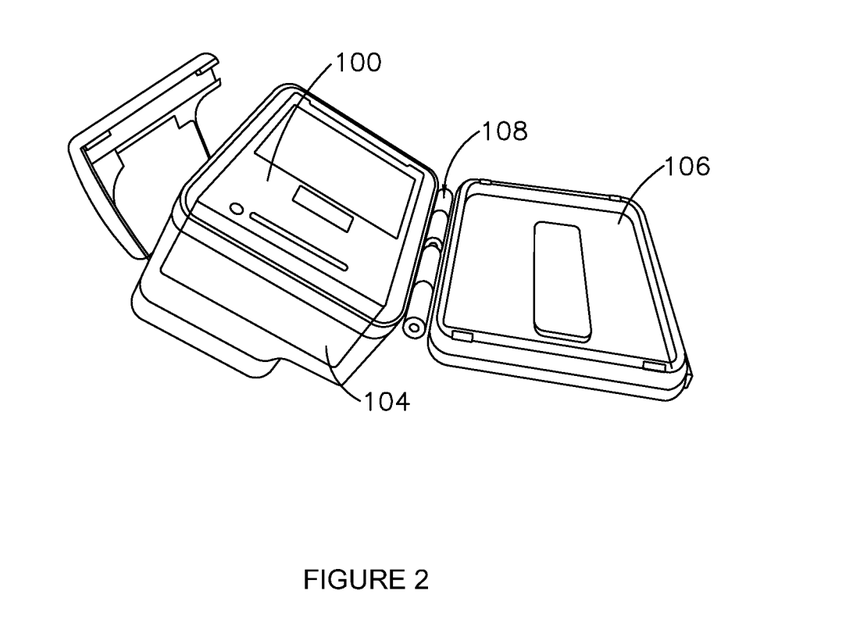
FIG. 2 illustrates the camera housing of FIG. 1 in an open position.
Figure 3:
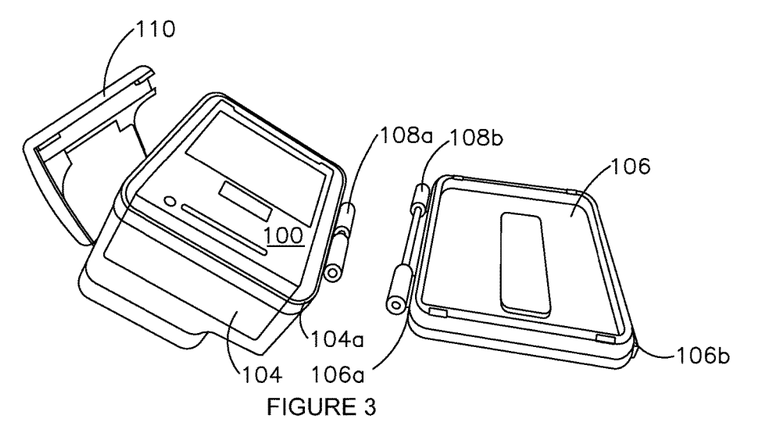
FIG. 3 illustrates the camera housing of FIG. 1 with a back housing portion removed.

FIG. 1 illustrates a side plan view of a typical camera housing with a point of view camera located inside the housing. FIG. 2 illustrates the camera housing of FIG. 1 in an open position. FIG. 3 illustrates the camera housing of FIG. 1 with a back cover portion removed. The following discussion refers interchangeably to FIGS. 1-3.

As shown, a point of view (POV) camera 100 is located inside a camera housing 102 operable between an open position and a closed position. The camera housing 102, which includes a front housing portion 104 detachably connected to a back housing portion 106, protects the camera 100 from environmental conditions.

The front housing portion 106 includes a front face, a top face, a bottom face, a left side face, and a right side face structured to form a cavity that receives the camera 100. The back housing portion 106, which includes a back face, a top face, a bottom face, a left side face, and a right side face, detachably couples with the front housing portion 104 opposite the front face of the front housing portion 104. The front housing portion 104 and back housing portion 106 are collectively structured to enclose the camera 100 within the cavity when the back housing portion 106 is secured to the front housing portion 104 in a closed position.

A first hinge portion 108a located on a bottom edge 104a of the front housing portion 104 detachably couples to a second hinge portion 108b located on a bottom edge portion 106a of the back housing portion 106. The first hinge portion and the second hinge portion form a hinge 108 when coupled such that the back housing portion 106 pivotally attaches to the front housing portion 104 about the hinge 108.

A fastening structure 110 is located on an edge portion 104b of the top face of the front housing portion 104 and is configured to extend over the top face of the front housing portion 104 and detachably couple to a top edge portion 106b of the back housing portion 106. As such, the back housing portion 106 is secured to the front housing portion 104 in a closed position when the fastening structure 110 is coupled to the top edge portion 106b of the back housing portion 106.

A mounting structure 112 is located on the bottom face of the front cover portion 104 for mounting or securing the housing 102 onto a moving or stationary object. For example, the housing 102 may be mounted outside planes, cars, or boats; or mountable on headgear, helmets, clothing items or other types of equipment or items wearable by a user.

Battery Pack

In one aspect of the present disclosure, a battery pack may be utilized to increase the operational time of an electronic device, such as a POV camera. As described in further detail below, the battery of an electronic device may be removed and replaced with a connector block. The battery pack may be electrically connected to the connector block providing power to the electronic device via the connector block.

Figure 4:
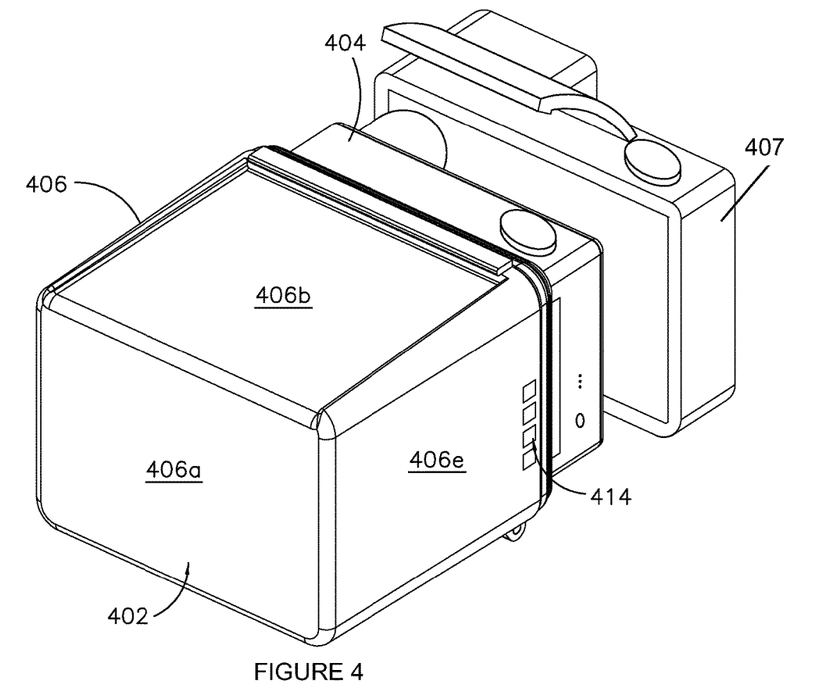
FIG. 4 illustrates an exploded side elevation view of a battery pack, point of view camera and front housing portion, according to one aspect.
Figure 5:
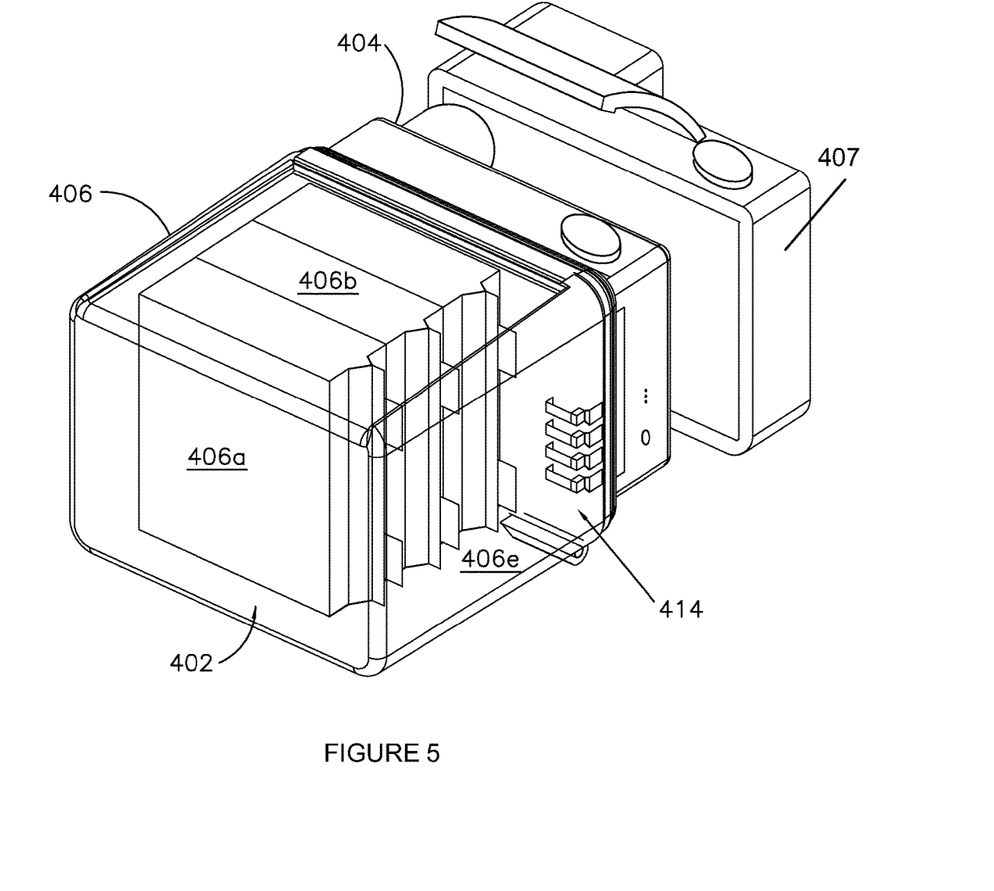
FIG. 5 illustrates the battery pack, point of view camera and front housing portion of FIG. 4 showing the internal structure of the battery pack.
Figure 6:
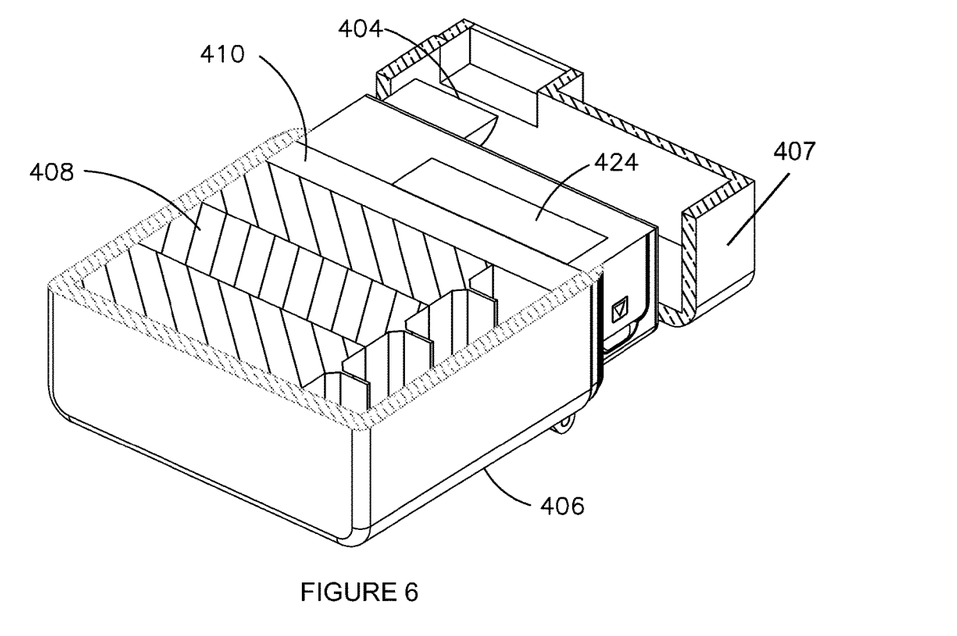
FIG. 6 illustrates a cross sectional view of the battery pack, point of view camera and front housing portion of FIG. 5.
Figure 7:
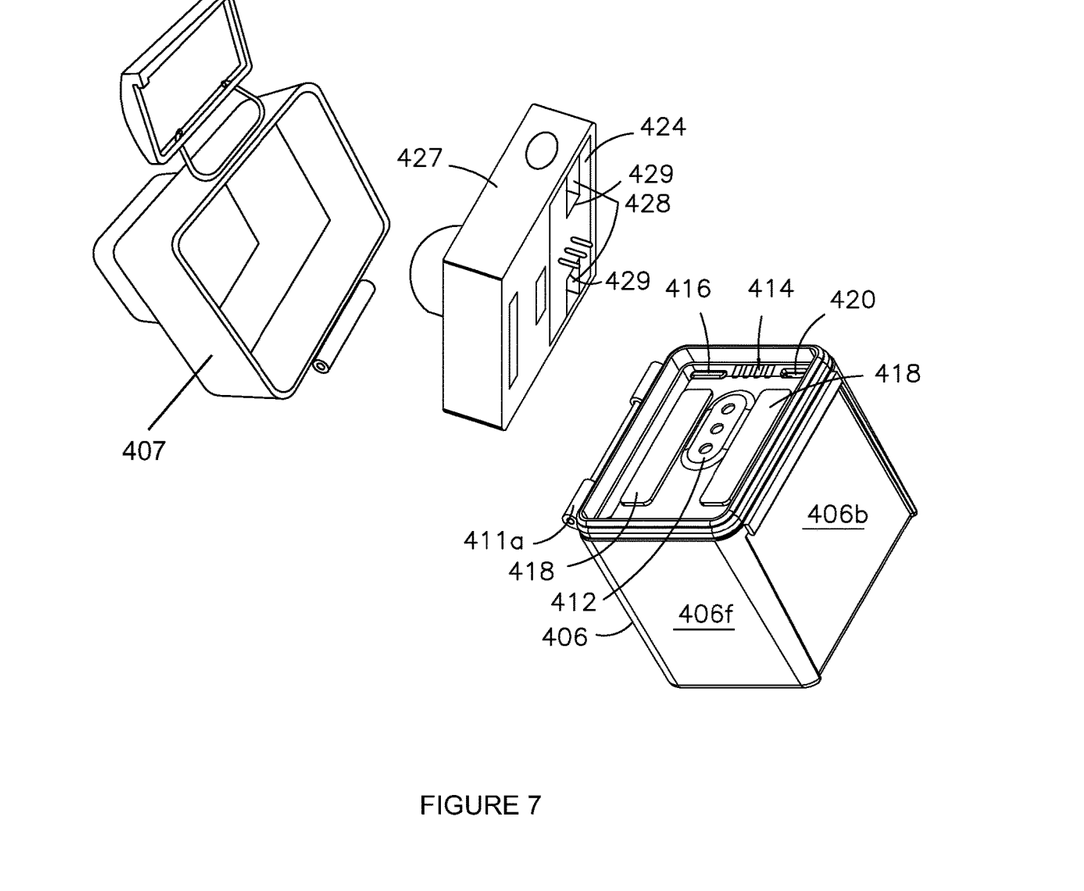
FIG. 7 illustrates an exploded view of the battery pack, point of view camera and front housing portion of FIG. 4.
Figure 8:
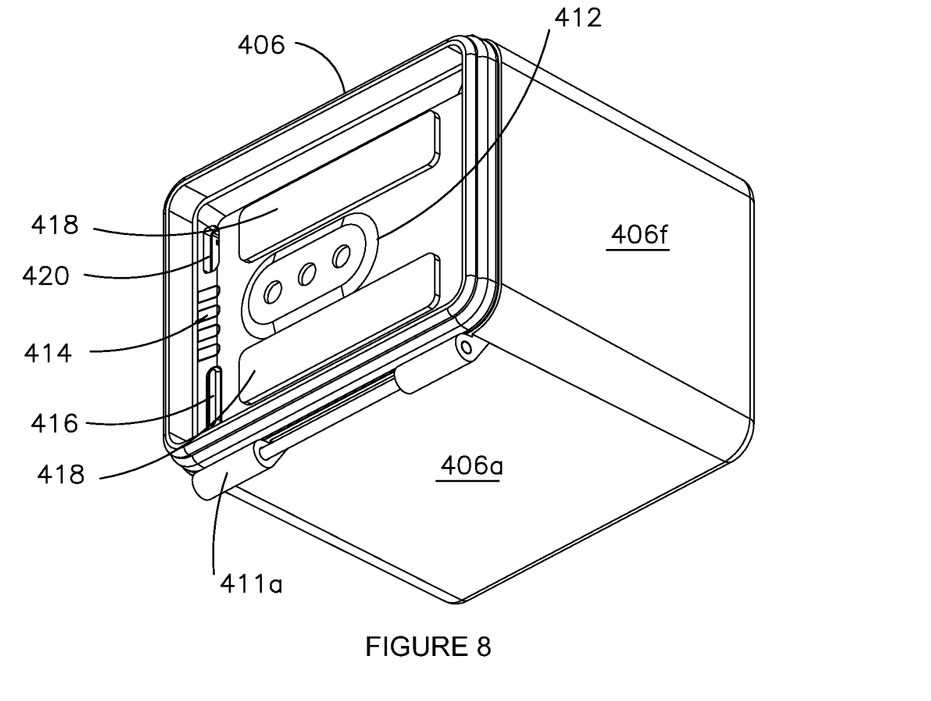
FIG. 8 illustrates a front perspective view of the battery pack of FIG. 4.
Figure 9:
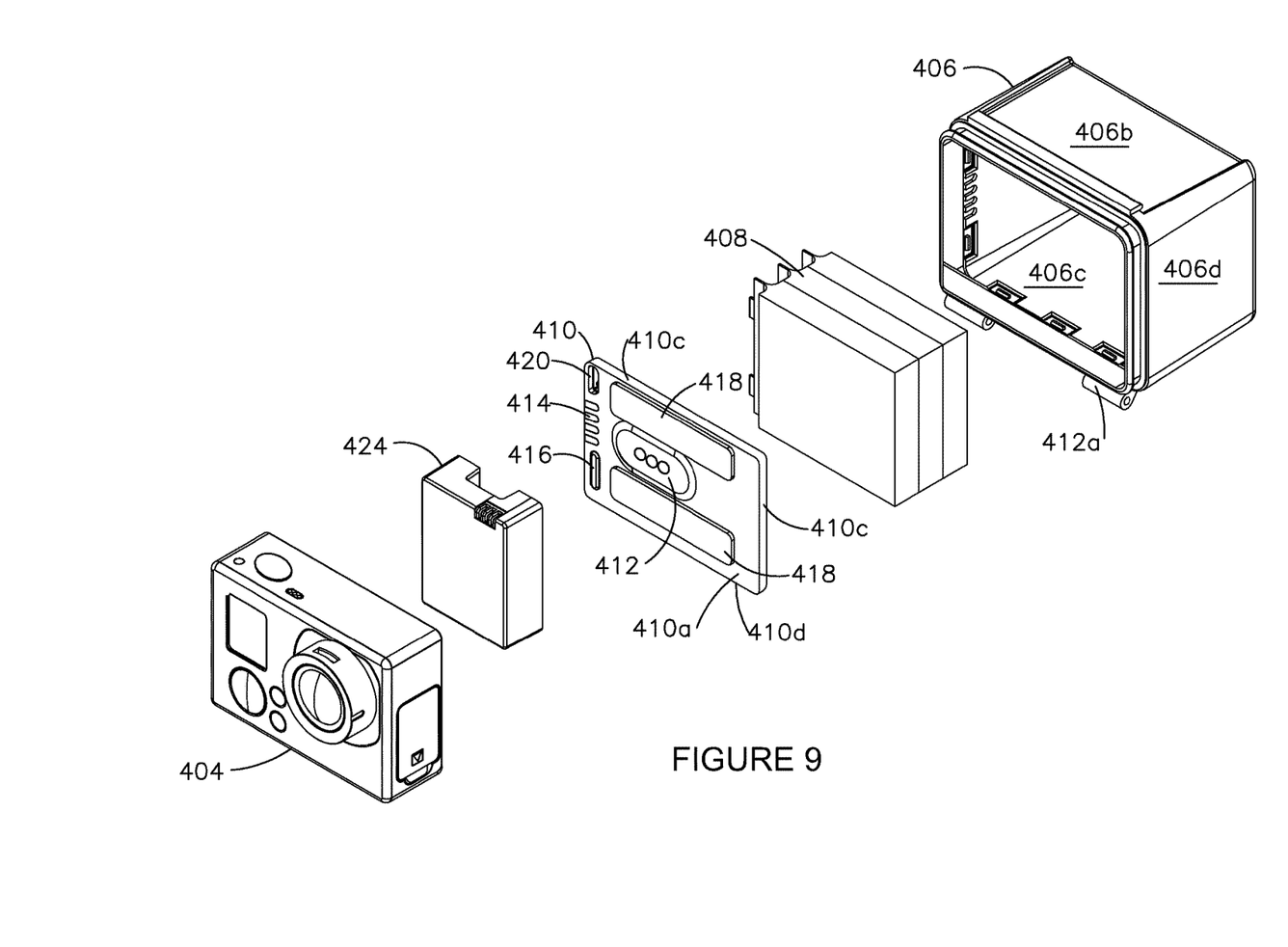
FIG. 9 illustrates a front perspective exploded view of the battery pack and point of view camera of FIG. 4.
Figure 10:
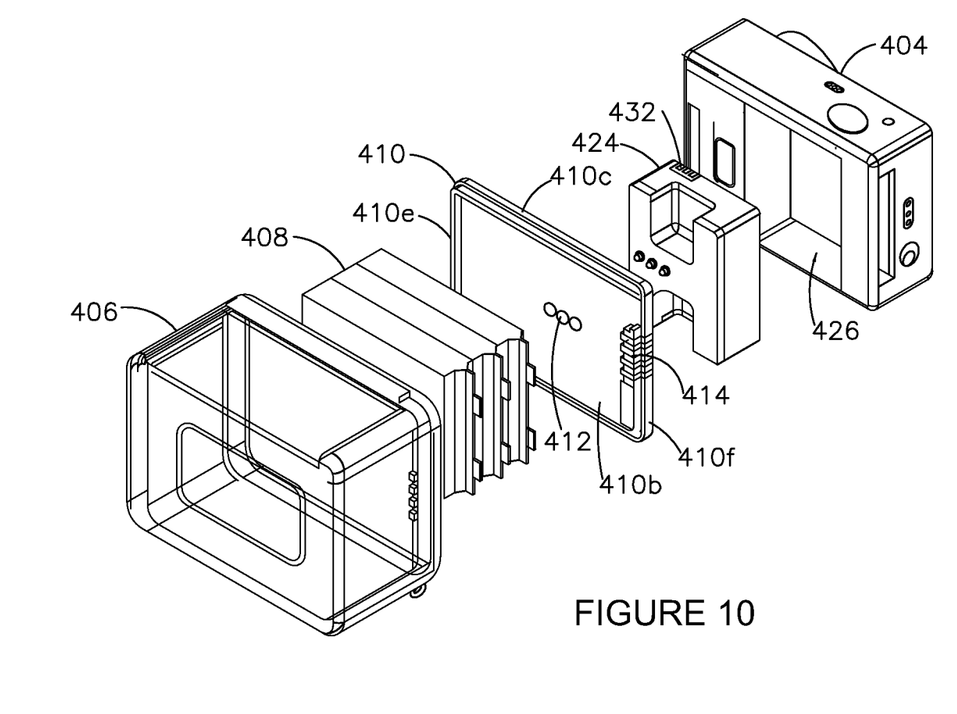
FIG. 10 illustrates a back perspective exploded view of the battery pack and point of view camera of FIG. 4.
Figure 11:
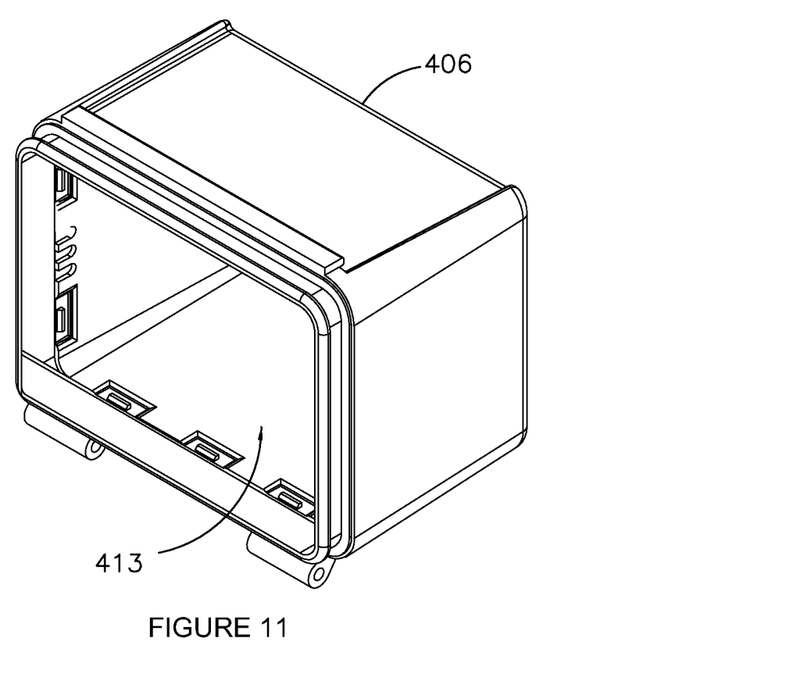
FIG. 11 illustrates a front perspective view of the outer battery housing of FIG. 4.

FIG. 4 illustrates an exploded side elevation view of a battery pack, point of view camera and front housing portion, according to one aspect. FIG. 5 illustrates the battery pack, point of view camera and front housing portion of FIG. 4 showing the internal structure of the battery pack. FIG. 6 illustrates a cross sectional view of the battery pack, point of view camera and front housing portion of FIG. 5. FIG. 7 illustrates an exploded view of the battery pack, point of view camera and front housing portion of FIG. 4. FIG. 8 illustrates a front perspective view of the battery pack of FIG. 4. FIG. 9 illustrates a back perspective exploded view of the battery pack and point of view camera of FIG. 4. FIG. 10 illustrates a front perspective exploded view of the battery pack and point of view camera of FIG. 4. The following discussion refers interchangeably to FIGS. 4-10.

The battery pack 402 includes an outer battery housing 406, one or more batteries (or battery cells) 408 and an inner battery housing 410. The outer battery housing 406 includes a back side 406a, a top side 406b, a bottom side 406c, a left side 406d, and a right side 406e structured to form a cavity 413 that may receive the one or more batteries 408. The outer battery housing 406 may be made from any suitable material, including but not limited to acrylic or other clear polished plastic. According to one aspect, the cavity 413 of the outer battery housing 406 may be painted for decorative purposes.

The inner battery housing 410, which includes a front surface 410a, a back surface 410b, a top edge 410c, a bottom edge 410d, a left edge 410e, and a right edge 410f, may detachably couple with the outer battery housing 406 opposite the back side 406a of the outer battery housing 406. The outer battery housing 406 and the inner battery housing 410 are collectively structured to enclose the one or more batteries 408 within the cavity when the inner battery housing 410 is secured to the outer battery housing 406. According to one aspect, the opening of the cavity may be sized to receive the inner battery housing 410 and retain the inner battery housing 410 with a friction fit, thereby retaining the outer battery housing 408 and the inner battery housing 410 together. Of course, retention of the inner battery housing 410 within the cavity of the outer battery housing 406 with a friction fit is merely one example, and in other examples or embodiments within the scope of the present disclosure, the inner battery housing 410 may be secured to the outer battery housing 406 to enclose the batteries 408 utilizing any suitable fastener or fastening means. Furthermore, in some exemplary embodiments, the outer battery housing 406 and the inner battery housing 410 may be integrated into a single battery housing that houses the one or more batteries 408.

Similar to the camera housing 102 in FIGS. 1-3, an outer battery housing hinge portion 411a may be located on the bottom side 406c of the outer battery housing 406, below the opening of the cavity, for detachably coupling to a front hinge portion 411b of a front housing portion 407 of an electronic device housing 409, as described in further detail below with reference to FIGS. 18-19. The outer battery housing hinge portion 411a and the front hinge portion 411b of the electronic device housing 409 form a hinge 411 when coupled together allowing the outer battery housing 406 to swing freely. Allowing the outer battery housing 406 to swing freely from the front hinge portion 411b of the electronic device housing 409 enables the user to easily open the electronic housing device 409 to access the electronic device and the inner battery housing 410. Although the outer battery housing 406 and the front housing portion 407 are described as hingedly secured together, this is by way of example only and the outer battery housing 406 and the front housing portion 407 may be secured by any means or method known in the art.

In some examples, when the outer battery housing 406 is mechanically connected to the front housing portion 407 of the electronic housing, a waterproof seal may be created protecting the electronic device within the electronic housing from coming into contact with water or other liquid.

As shown in FIGS. 9-10, the inner battery housing 410 may include a plurality of inner battery housing electrical connections 412 extending through the inner housing portion 410 from the front surface 410a to the back surface 410b. The plurality of inner battery housing electrical connections 412 may be configured for providing mechanical and electrical connection to the one or more batteries 408. According to one example, a battery gauge may be utilized to monitor how much power or operational time is left in the one or more batteries 408. Battery gauge indicators 414 may be located on the right edge 410f or the left edge 410e of the inner battery housing 410 and visible from an exterior of the outer battery housing 406. The battery gauge indicators 414 may be light emitting diodes which provide the user a visual indication of how much life is left in the current charge of the one or more batteries 408. Although the battery gauge indicators 414 are shown as four (4) light emitting diodes (LEDs), this is by way of example only and more than four (4) or less than four (4) LEDs may be utilized.

A battery test button 416, in electrical communication with the one or more batteries 408, may be located on the front surface 410*a* of the inner battery housing 410. As shown in FIGS. 7 and 9, the battery test button 416 may be located below the battery gauge indicators 414. To determine how much operational time the one or more batteries 408 can support without recharging them, the user may press and release the battery test button 416. For example, each of the battery gauge indicators 414 may represent 25% of a full charge. If all four (4) gauge indicators light up, the battery is between 75 and 100 percent charged. Fully discharged batteries do not trigger any indicator gauge indicator lights.

According to one aspect, one or more foam pads 418 may be located on the front surface 410*a* of the inner battery housing 410. The foam pads 418 may have a generally rectangular configuration and extend between the left and right edges 410*e*, 410*f* of the inner battery housing 410. The foam pads 418 may be used for security to prevent the inner battery housing 410 from moving or shifting around and as well as maintaining the plurality of inner battery housing electrical connections 412 in electrical communication with a first plurality of connector block electrical connections (e.g. pogo pins 430) on a connector block 424, described below.

According to one aspect, a universal serial bus (USB) connector 420 may be located on the inner battery housing 410 (e.g., on the front surface 410*a*) and used to recharge the one or more batteries 408. The USB connector 420 may be used to place the one or more batteries 408 in electrical communication with an electrical outlet or other source of power. The USB connector 420 may also be used to connect to another electronic device, such as a mobile phone, for charging the mobile phone.

Connector Block

Figure 12:
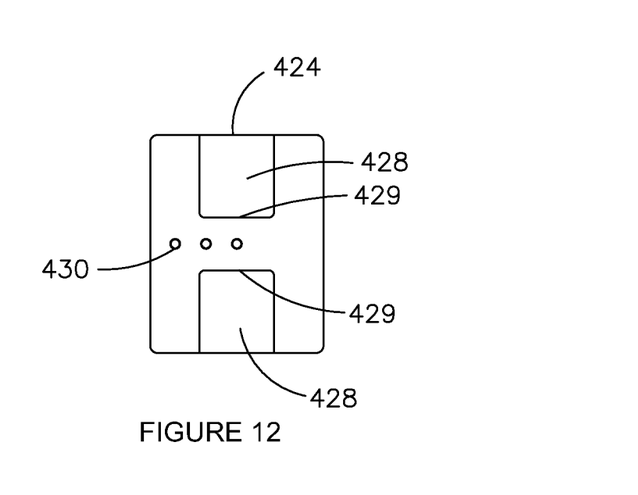
FIG. 12 illustrates a front plan view of a connector block, according to one aspect.
Figure 13:
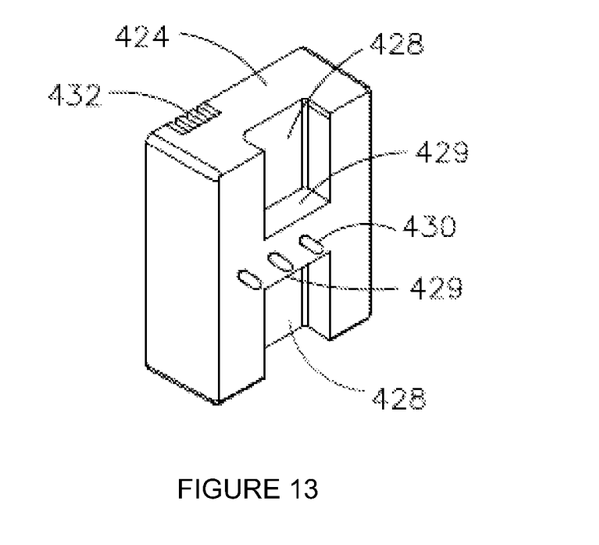
FIG. 13 illustrates a side perspective view of the connector block of FIG. 12

To secure the battery pack 402 to the camera 404 or other electronic device, the original battery of the camera, or other electronic device, may be removed and replaced with a connector block 424. The connector block 424 may be sized to be received within the battery chamber 426 of the electronic device, i.e. the cavity or opening formed when the original battery is removed from the electronic device. As shown in FIGS. 12-13, the connector block 424 may have a generally rectangular configuration and include a pair of opposing finger grips 428 adapted to receive fingers of a user allowing the user to easily insert and remove the connector block 424 from the battery chamber 426 of the camera 404. As illustrated, the finger grips 428 may be configured by removing corresponding portions (openings or concave portions) of the connector block 424 to provide for opposing surfaces 429 enabling the user to grip the opposing surfaces 429 to insert or remove the connector block 424 to or from the battery chamber 426. The first plurality of connector block electrical connections (e.g., pogo pins 430) may be located between the pair of opposing finger grips 428, and may be used to establish a secure mechanical and electrical connection to the plurality of inner battery housing electrical connections 412 extending through the inner housing portion 410. As described above, the plurality of inner battery housing electrical connections 412 may be configured for providing mechanical and electrical connection to the one or more batteries 408 in the battery pack 402. A second plurality of connector block electrical connections 432, in mechanical and electrical communication with the first plurality of connector block electrical connections 430, may be located on an outer surface of the connector block 424 for providing power to the camera 404 or other electronic device in which the connector block 424 is inserted.

As described in further detail below, the connector block 424 may be a separate and distinct component from the battery pack 402. The battery pack 402 may come into contact with the first plurality of connector block electrical connections 430 when the outer battery housing 406 is mechanically connected to the front housing portion 407 of the electronic device.

Battery Pack System Snaps onto a Front Housing Portion of an Electronic Device Housing To utilize the battery pack system of the present disclosure, the original battery of an electronic device may be removed revealing the battery chamber 426, as described above. The connector block 424 may then be inserted into the battery chamber 426 forming a modified electronic device 427. (See FIG. 7)

To protect the modified electronic device 427 and the contents of the battery pack 402 from environmental conditions, the outer battery housing 406 of the battery pack 402 may be detachably coupled to the front housing portion 407 of the electronic device housing 409. As discussed previously, the outer battery housing hinge portion 411*a* may be located on the bottom side 406*c* of the outer battery housing 406, below the opening of the cavity, for detachably coupling to the front hinge portion 411*b* of the front housing portion 407 of the electronic device housing 409. When the outer battery housing hinge portion 411*a* is secured to the front hinge portion 411*b* of the electronic device housing 409, a hinge 411 may be formed.

Figure 14:
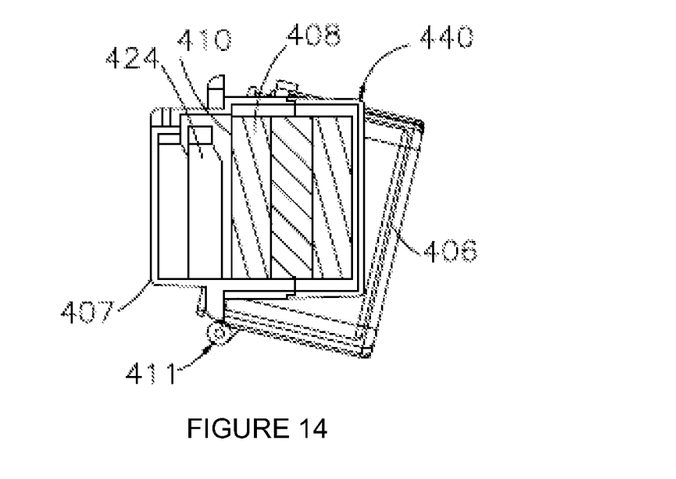
FIG. 14 illustrates an example of mechanical interference created by structuring the battery pack improperly.

In order for the outer battery housing 406 to couple to the front housing portion 407, mechanical interference between the outer battery housing 406 and the one or more batteries 408 needs to be prevented. For example, as shown in FIG. 14, the outer battery housing 406 is unable to swing over the one or more batteries 408 and detachably couple to the front housing portion 407 causing mechanical interference 440 between the outer battery housing 406 and the one or more batteries 408. According to one aspect, mechanical interference may be prevented by integrating the parts of the battery pack into a single component (i.e., the inner battery housing 410, the one or more batteries 408 and the outer battery housing 406 may be integrated into a single component).

Figure 15:
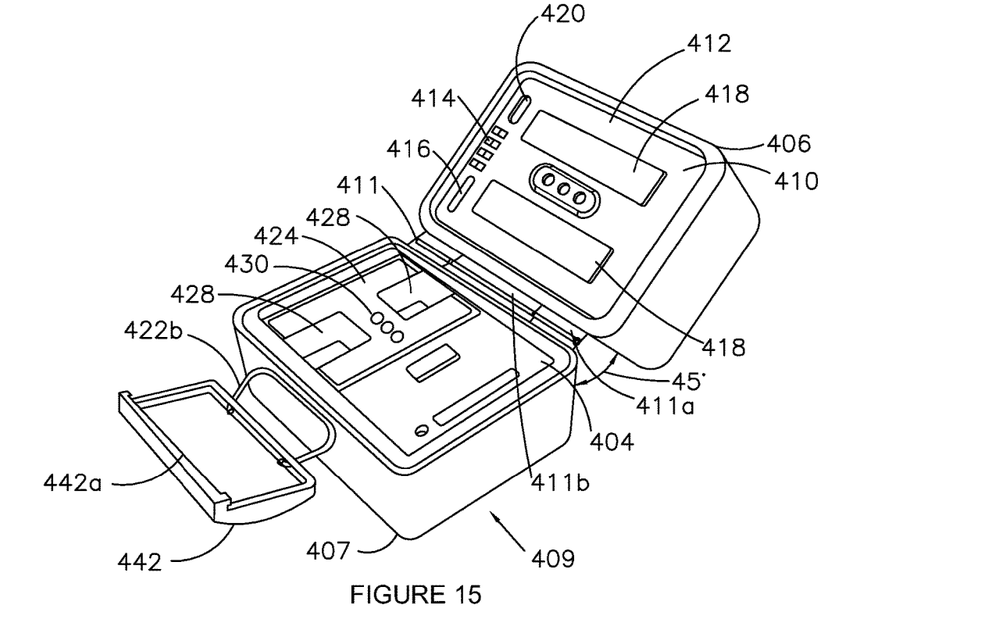
FIG. 15 illustrates the battery pack of FIG. 8 hingedly connected to the front housing portion in an open position.

The modified electronic device 427 (i.e. the electronic device with the connector block 424) may be placed within the front housing portion 407 of the electronic housing either before or after the battery pack 402 is secured to the front housing portion 407. FIG. 15 illustrates the battery pack 402 of FIG. 8 hingedly connected to the front housing portion 407 in an open position.

A latching mechanism 442 may be located on a top surface of the front housing portion 407. The latching mechanism 442 may include a latching portion 442*a* pivotably attached to a base portion 442*b* which is pivotably attached to the top surface of the front housing portion 407. The latching portion 442*a* may have a generally rectangular shape configured to be pulled forward over the top side 406*b* of the outer battery housing 406 and pushed back detachably coupling to an edge of the top side 406*b* of the outer battery housing 406. As such, the outer battery housing 406 may be secured to the front housing portion 407 in a closed position when the latching mechanism 442 is coupled to the edge of the top side 406*b* of the outer battery housing 406.

Figure 16:
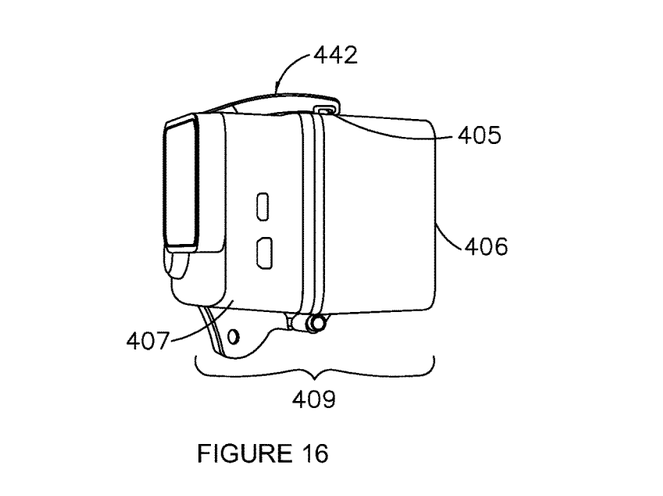
FIG. 16 illustrates the battery pack of FIG. 8 hingedly connected to the front housing portion in a closed position.

FIG. 16 illustrates the battery pack of FIG. 8 hingedly connected to the front housing portion in a closed position. In some examples, when the outer battery housing 406 is mechanically connected to the front housing portion 407 of the electronic device housing 409, a waterproof seal may be created protecting the electronic device from coming into contact with water or other liquid.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. A battery pack system, comprising:
 a connector block sized to be received within an empty battery chamber of an electronic device, the connector block having a first plurality of connector block electrical connections and a second plurality of connector block electrical connections in electrical communication with the first plurality of connector block electrical connections for providing power to the electronic device; and
 a battery pack, the battery pack comprising
  an outer battery housing having a back side, a top side, a bottom side, a left side and a right side structured to form a cavity;
  one or more batteries adapted to be received within the cavity; and
  an inner battery housing, having a front surface, a back surface, a top edge, a bottom edge, a left edge and a right edge, for detachably coupling with the outer battery housing opposite the back side of the outer battery housing to enclose the one or more batteries within the outer battery housing, the inner battery housing comprising a plurality of inner battery housing electrical connections extending from the front surface to the back surface and adapted to connect to the first plurality of connector block electrical connections of the connector block.

2. The system of claim 1, wherein the inner battery housing further comprises:
 a battery test button, in electrical communication with the one or more batteries, located on the front surface of the inner battery housing; and
 a plurality of battery gauge indictors, in electrical communication with the battery test button and the one or more batteries, located on the right edge or left edge of the inner battery housing and visible from an exterior of the outer battery housing.

3. The system of claim 2, wherein the plurality of gauge indicators are light emitting diodes.

4. The system of claim 1, wherein the inner battery housing further comprises:
 a universal serial bus (USB) connector, in electrical communication with the one or more batteries and located on the inner battery housing, adapted for connecting with a power source for recharging the one or more batteries.

5. The system of claim 4, wherein the USB connector is adapted to connect to and charge a mobile communication device.

6. The system of claim 1, wherein the inner battery housing includes a pair of opposing foam pads located on the front surface to maintain electrical communication between the plurality of inner battery housing electrical connections and the first plurality of connector block electrical connections.

7. The system of claim 1, wherein the connector block includes a pair of opposing finger grips, the first plurality of connector block electrical connections located between each finger grip of the pair of opposing finger grips.

8. The system of claim 1, wherein the outer battery housing further comprises an outer battery housing hinge portion adapted to snap onto a first hinge portion of a front housing portion of an electronic device housing, the electronic device secured within the front housing portion.

9. The system of claim 8, wherein the outer battery housing is adapted to swing towards the front housing portion of the electronic device housing when snapped onto the first hinge portion.

10. The system of claim 8, wherein the outer battery housing mechanically connects to the front housing portion of the electronic device housing creating a waterproof seal.

11. The system of claim 1, wherein the electronic device is a point of view camera.

12. The system of claim 1, wherein the connector block is a separate and distinct component from the battery pack, and wherein the battery pack is configured to come into electrical contact with the first plurality of connector block electrical connections when the battery pack is mechanically connected to the electronic device.

13. The system of claim 12, wherein the battery pack is configured to come into electrical contact with the first plurality of connector block electrical connections when the outer battery housing is mechanically connected to a front housing portion of the electronic device.

* * * * *